April 28, 1936.  H. P. MORRIS  2,038,592
METHOD OF AND MEANS FOR SHRINKING ARTICLES
Filed Dec. 17, 1934
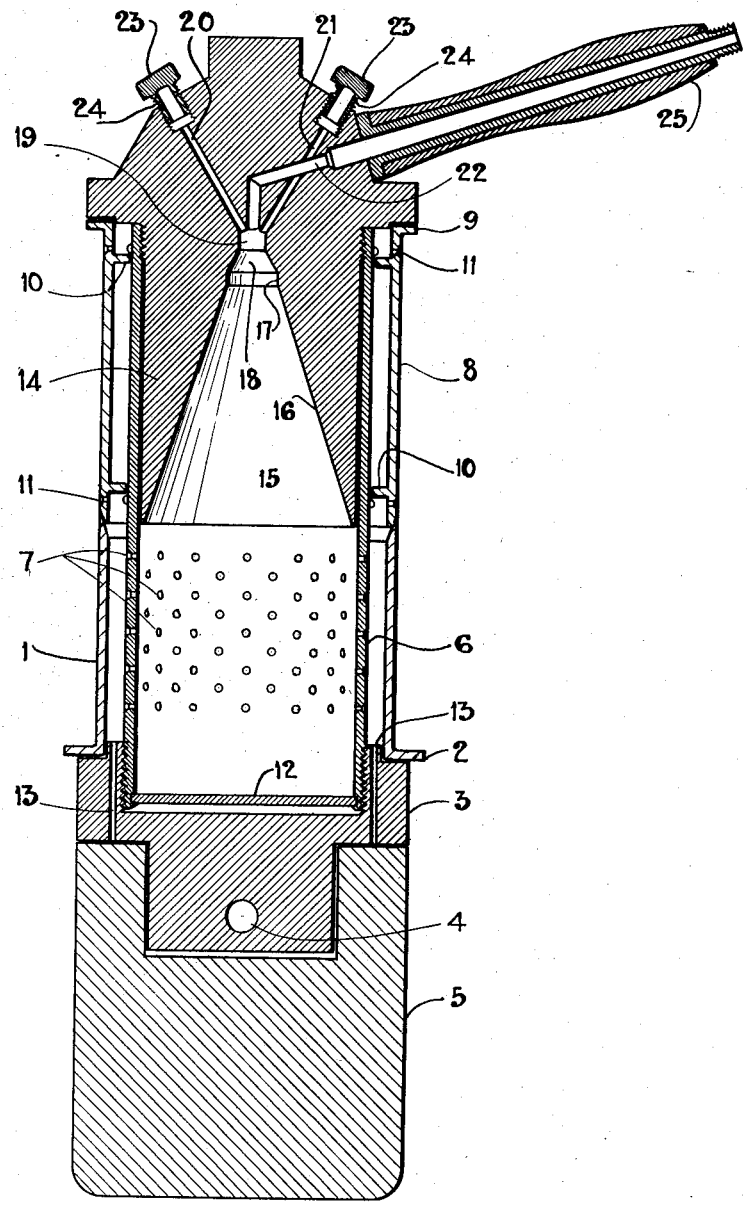
INVENTOR
H. P. MORRIS.
BY
ATTORNEY Patented Apr. 28, 1936

2,038,592

UNITED STATES PATENT OFFICE 2,038,592

METHOD OF AND MEANS FOR SHRINKING ARTICLES

Harry P. Morris, San Diego, Calif.

Application December 17, 1934, Serial No. 757,981

14 Claims. (Cl. 62—1)

(Granted under the act of March 3, 1883, as amended April 30, 1928; 370 O. G. 757)

This invention relates to the use of a gas, such as carbon dioxide, for shrinking articles such as bushings, etc., to facilitate their removal from and seating in machine parts.

It is the object of this invention to provide means for applying the gas to the article to be shrunk in such a manner that clogging of holes by the solidified gas, the so-called "ice formation", is avoided, the commingling of the gas with the air mixed therewith is made more uniform and complete, and the operation is in general made more effective and satisfactory.

The drawing shows, in longitudinal section, one embodiment of my invention that has worked out well in practice.

Owing to its property of solidifying and forming "dry ice", which is capable of producing very low temperatures, when permitted to expand from a state of great compression, carbon dioxide has come into considerable use for shrinking bushings and other machine parts that are assembled with a pressed or shrink fit, to facilitate the removal and assembly of such parts. However, considerable difficulty has been encountered, due to the fact that at least a portion of the gas solidifies immediately upon the beginning of expansion and clogs the apertures through which the gas issues. I have found that if the orifices through which the gas passes to a zone of lower pressure are outwardly expanding, this undesirable effect is eliminated.

The numeral 1 designates the article to be shrunk, illustrated by a bushing for the master connecting rod of an airplane engine. The flange 2 on the bushing is seated in a rabbet in the seal and guide nut 3 which is connected by pin 4 to a pilot member 5, of material having low heat conductivity. The hole in which pin 4 is disposed may be engaged by a rod to screw nut 3 upon sleeve 6 with which it is engaged. The sleeve 6 is of a length somewhat more than twice that of the bushing 1 with which it is to be used, and is provided with a plurality of apertures 7 whereof the radially outer portions are of outwardly increasing diameter. This form of aperture causes the gas passing therethrough to move in an expanding conical stream and prevents the formation of eddies and vortices adjacent the outer surface of the sleeve, with the resultant accumulation of solidified gas at the mouth of the orifice and consequent rapid closing of the aperture by the ice so formed. The apertured area of the sleeve is of slightly less longitudinal extent than the length of the bushing 1.

Seated against the upper end of bushing 1 is a cylindrical member 8 having an outwardly turned flange 9 at its upper end and internal radially extending circumferential ribs 10 which fits against sleeve 6, there being apertures 11 formed in member 8 between the flanges 10 and the adjacent ends of the member 8 to permit escape of gas from the space between the bushing 1 and the sleeve 6. The device is shown assembled to remove a bushing, but when it is to be used to seat a bushing the flange 9 of member 8 is seated against the flange 2 of the bushing, thus providing greater bearing surfaces and eliminating the possibility of deforming the bushing when pressure is applied to the member 8 to force the bushing into its seat. The lower end of sleeve 6 may be closed by a disk 12. Passages 13 in nut 3 provide additional avenues of escape for gas from the space between sleeve 6 and bushing 1.

Engaged with the upper end of sleeve 6 and seated against the corresponding end of cylindrical member 8 is a mixing head 14 in which the gas and air are mixed and initially expanded. The head 14 has in it a chamber 15 that has a frusto-conical portion 16, with the large end thereof opening at the inner end of the head and the small end opening into a cylindrical portion 17, continued by a second frusto-conical portion 18 and that in turn by a second cylindrical portion 19, into which the air ducts 20 and 21, and the gas duct 22 discharge. Hollow studs 23, having holes 24 through their side walls for the passage of air, control the flow of air into the mixing chamber, the portion of the holes effective for the passage of air being regulated by adjusting the studs 23 in or out. The hollow handle 25, of heat insulating material, carries the carbon dioxide lead in. It will be observed that the air streams flow into the stream of gas at a plurality of points, thus securing good atomization of the air and gas and causing them to mix. The mixture begins to expand in chamber portion 18, but the expansion is checked in portion 17, thus altering the direction of flow and setting up turbulences that insure complete commingling of the air and the carbon dioxide, which then expands uniformly and gradually in the portion 16 until discharged into sleeve 6, whence it passes through apertures 7 to impinge against bushing 1. Owing to the small size of the apertures 7 the pressure in sleeve 6 is kept sufficiently high to prevent appreciable solidification of the gas, but after the gas has issued from the orifices 7 a practically complete expansion of the gas to atmospheric pressure occurs and the solid carbon dioxide is formed on bushing 1, which results in quick and thorough chilling of the bushing so it can be removed. Pressure may be applied to the head 14 by any suitable mechanism to force the bushing from its seat.

For shrinking small articles the velocity of the liquid gas passing from 22 through 18 creates a suction through the ducts 20 and 21 which draws in sufficient air for mixture with the gas. Compressed air may be supplied through the ducts 20 and 21 for shrinking long or large articles when it is necessary to carry the gas to the most remote parts of the inner surface of the article in the shortest possible time so that all portions of the article will be contacted uniformly and the shrinking of all parts take place concurrently.

The reason for admitting air to the system is that if the gas is supplied to the tool in a liquid form and without air or expansion escape the gas will pass through the tool as a liquid and expand after escape to the atmosphere, thus losing the desired effect of the mixing chamber 15 and the expansion between the sleeve and the article to be shrunk.

A further desirable result is obtained by permitting the expansion of the air and gas in the portion 18, since this prevents back pressures on the air intakes and so permits free flow of the air. The exhaust passages 11 and 13, being close to the bushing, produce substantially equal distribution and expansion of the carbon dioxide over the entire inner surface of the bushing, which results in uniform shrinkage thereof.

The invention herein disclosed may be made and used by or for the Government of the United States, for governmental purposes, without payment of royalty therefor.

I claim:

1. In a device of the class described, a hollow cylindrical member having an outwardly turned flange at one end and a radially inwardly extending rib adjacent but spaced from each end and a circumferential series of apertures between each of the last mentioned ribs and the adjacent end, a cylindrical sleeve disposed in said member, said sleeve being at least twice the length of said member and being substantially coterminous therewith at one end of the member, there being in said sleeve beyond the other end of said member a plurality of apertures whereof the radially outer portions are of outwardly increasing diameter, means cooperating with said sleeve to retain a hollow member in operative contact with the said other end of said member and surrounding said apertured portion of said sleeve, a mixing head engaged with said sleeve and extending thereinto substantially throughout the length of the unperforated portion of the sleeve, there being in said head a chamber that is substantially frusto-conical with its large end at the innermost end of said head, then cylindrical for a short distance, then frusto-conical for a somewhat greater distance and again cylindrical, there being air ducts and a gas supply duct opening into the last mentioned cylindrical portion, and means to control the quantity of air passing through said air ducts.

2. In combination, a cylindrical member, a sleeve disposed therein in spaced relation thereto, said sleeve being substantially coterminous with said member at one end and extending beyond said member a distance at least as great as the length of said member, the greater portion of the length of said sleeve beyond the said member being provided with a plurality of apertures whereof the radially outer portions are of outwardly increasing diameter, means cooperating with said sleeve to retain a hollow member around the perforated portion of said sleeve in operative relation with said cylindrical member, a mixing head extending into the unperforated end of said sleeve, said head having in it a chamber whereof the cross sectional area increases toward the innermost end of said head and opening into said sleeve adjacent the perforated portion of the sleeve, ducts to introduce air and a gas into the small end of said cavity, and means to control the flow of air through said ducts, there being provided apertures to permit escape of gas from the space between said sleeve and the hollow member therearound.

3. In combination, a sleeve, means cooperating therewith to support around said sleeve and in spaced relation thereto a hollow member of substantially less length than said sleeve, said sleeve having in it circumferential series of perforations extending over a length substantially equal to the length of said hollow member, the radially outer portions of the perforations in said sleeve being of outwardly increasing diameter, a mixing head extending into said sleeve substantially to said perforated portion, there being in said head a chamber that diminishes in cross sectional area away from said perforated portion, means to supply air and a gas to the smaller end of said cavity, and means mounted on said head to control the flow of air into said chamber.

4. In a device for cooling a hollow member by the expansion of a compressed gas therein, a sleeve having a portion that may be disposed in such hollow member, the said portion being provided with apertures whereof the portions opening immediately and directly into the zone of final expansion are of outwardly increasing diameter.

5. In a device for cooling a hollow member by the expansion of a compressed gas therein, a sleeve having a portion that may be disposed in such hollow member, the said portion being provided with apertures whereof the opening at the outer surface of the sleeve is of greater diameter than is the opening at the inner surface of the sleeve, the diameter of said openings decreasing uniformly inwardly from the outer face of the sleeve for a distance less than the thickness of the sleeve.

6. In apparatus of the class described, a device for mixing air with a gas under compression, comprising a member having in it a chamber that has a substantially frusto-conical portion with the large end thereof opening on a face of said member, then a cylindrical portion of the same diameter as the small end of the first mentioned portion, then a second frusto-conical portion whereof the large end is the same diameter as is said cylindrical portion, then a second cylindrical portion of the same diameter as is said second frusto-conical portion, there being a plurality of air ducts and a gas duct opening into said second cylindrical portion in proximity to each other, whereby the air and gas from said ducts are intimately commingled, and means to control the flow of air through said air ducts.

7. In apparatus of the class described, a device for mixing air with a gas under compression, comprising a member having in it a plurality of passages for air and a passage for gas, all converging to a common point, and a chamber in communication with said passages and extending thence to a face of said member, the cross sectional area of said cavity increasing toward said face, the said increase in cross sectional area being not uniform adjacent said passages, whereby turbulences are set up in the stream of commingled gas and air to cause thorough mixing of the same.

8. A method of shrinking articles, which comprises the steps of commingling a stream of air and a stream of a gas under pressure, said gas having the property of producing a low temperature when expanded from a state of high compression, causing the commingled air and gas to expand gradually, and applying said expanded gas and air to said article in a plurality of jets that are confined for a portion of their paths to a cylindrical form and then to a frusto-conical form for an additional portion of their paths.

9. A method of shrinking articles, which comprises the steps of adding air in a plurality of streams to a stream of gas under high pressure, mixing said air and gas with turbulence, causing said mixed air and gas to expand gradually, and applying the expanded air and gas to said article in a plurality of jets that are confined for a portion of their paths to a cylindrical form and then to an expanding path for an additional portion of their paths before release of the gas and air from restraint to contact the article being shrunk.

10. A method of shrinking articles, which comprises the steps of adding air in a plurality of streams to a stream of gas under high pressure, mixing said air and gas with turbulence, causing said mixed air and gas to expand gradually, and applying the expanded air and gas to said article in a plurality of jets.

11. A method of shrinking articles, which comprises the steps of adding air in a plurality of streams to a stream of gas under high pressure, mixing said air and gas with turbulence, causing said mixed air and gas to expand gradually, and thereafter applying said gas in conically expanding jets at the same instant to the major portion of the inner surface of the article.

12. In a device for cooling a hollow member by the expansion of a compressed gas therein, a sleeve having a portion that may be disposed in such hollow member, the said portion being provided with apertures each of which has a conical opening with the base of the cone at the face of the sleeve in contact with the finally expanded gas.

13. Means for introducing a compressed gas into an article to be shrunk by expansion of said gas, comprising a hollow member insertable into such article there being through the wall of said member a plurality of apertures disposed to permit direct impingement of gas from said member upon at least the major portion of the inner surface of such article, said apertures each having a conical opening with the base of the cone at the face of said member in contact with the finally expanded gas.

14. A method of shrinking articles, which comprises the steps of intimately mixing a current of air with a current of gas under high pressure, permitting said mixture to expand and applying the expanded mixture to the article to be shrunk.

HARRY P. MORRIS.